(12) United States Patent
Janowicz et al.

(10) Patent No.: US 8,309,671 B2
(45) Date of Patent: Nov. 13, 2012

(54) EXTRUDABLE ACRYLIC COMPOSITIONS

(75) Inventors: Andrew Janowicz, Lakeland, TN (US); Walter H. Delphin, Germantown, TN (US); Connie D. Dickerson, Cordova, TN (US)

(73) Assignee: Lucite International, Inc., Cordova, TN (US)

( * ) Notice: Subject to any disclaimer, the term of this patent is extended or adjusted under 35 U.S.C. 154(b) by 720 days.

(21) Appl. No.: 12/083,967

(22) PCT Filed: Oct. 13, 2006

(86) PCT No.: PCT/US2006/040144
§ 371 (c)(1),
(2), (4) Date: Aug. 31, 2009

(87) PCT Pub. No.: WO2007/050325
PCT Pub. Date: May 3, 2007

(65) Prior Publication Data
US 2010/0036047 A1    Feb. 11, 2010

Related U.S. Application Data

(60) Provisional application No. 60/729,207, filed on Oct. 24, 2005.

(51) Int. Cl.
*C08F 220/14* (2006.01)
*C08F 220/18* (2006.01)
*C08F 2/38* (2006.01)

(52) U.S. Cl. ............... 526/328.5; 526/329.7; 525/330.3
(58) Field of Classification Search ............... 526/328.5, 526/329.7; 525/330.3
See application file for complete search history.

(56) References Cited

U.S. PATENT DOCUMENTS

| | | | | |
|---|---|---|---|---|
| 4,369,299 | A | * | 1/1983 | Honda et al. ............... 526/329.7 |
| 5,352,500 | A | * | 10/1994 | Memon ......................... 428/35.7 |
| 5,643,645 | A | * | 7/1997 | Banyay et al. ............... 428/34.1 |
| 6,153,264 | A | * | 11/2000 | Schmid et al. ................ 427/318 |
| 6,165,563 | A | * | 12/2000 | Chandran et al. ............. 427/516 |
| 2002/0006979 | A1 | * | 1/2002 | Husemann et al. ............. 522/34 |
| 2006/0089474 | A1 | * | 4/2006 | Yamazaki et al. ............. 526/319 |

OTHER PUBLICATIONS

International Search Report mailed Mar. 5, 2008 in corresponding International Application No. PCT/US2006/040144.

* cited by examiner

*Primary Examiner* — Roberto Rabago
(74) *Attorney, Agent, or Firm* — Jones Day

(57) ABSTRACT

A novel extrudable acrylic composition having suitable physical and chemical resistance properties may also be thermoformable. Specific resistance to solvent crazing is desirable. Such compositions can be formed using a combination of a multifunctional chain transfer agent and a multifunctional crosslinking agent.

20 Claims, No Drawings

EXTRUDABLE ACRYLIC COMPOSITIONS

CROSS REFERENCE TO RELATED APPLICATION

This application is the National Phase application of International Application No. PCT/US2006/040144, filed Oct. 13, 2006, which designates the United States and was published in English and which claims the benefit of U.S. Provisional Application No. 60/729,207, filed Oct. 24, 2005. These applications, in their entirety, are incorporated herein by reference.

FIELD OF THE INVENTION

The invention relates to acrylic compositions, and methods of using the compositions. More specifically, the invention relates to extrudable acrylic compositions and articles made therefrom having specific chemical and physical properties.

INTRODUCTION OF THE INVENTION

Acrylic polymers are widely used in producing sheet having a wide variety of uses related to acrylic properties such as weatherability, clarity, surface hardness, mechanical strength, heat distortion resistance, and the like. One problem with sheet made from conventional "melt processible" or "extrusion grade" acrylic polymers, however, is that the resulting sheet is subject to "crazing" or crack formation when it is brought into contact with common solvents. Conventional acrylic polymers used in making sheet have relatively poor craze or crack formation resistance. Up to this time, only the very high molecular weight acrylic polymers prepared by cast methods, typically having molecular weights exceeding one million daltons, have demonstrated good solvent craze resistance. Cast acrylic polymers, such as those made by cell or continuous casting, have a practical problem, beyond their relatively high production cost, in that their melt flow rate is so low that they cannot ordinarily be extruded or melt calendared to produce sheet—that is, their "melt characteristics" do not permit extrusion or melt calendaring.

Resistance to the occurrence of craze or crack formation in the presence of a solvent (hereafter "solvent craze resistance") in an acrylic polymer sheet generally increases as molecular weight ("MW") of the acrylic polymer increases. If MW is too high, extruding or melt calendering sheet becomes difficult if not impossible. Thus, MW cannot be increased without restriction concerning practical processing. In addition, the melt flow index of acrylic polymers derived from methyl methacrylate ("MMA") can be increased by copolymerizing the MMA with certain other monomer(s). The melt flow index also can be increased by adding one or more plasticizers or lubricants. These methods, however, reduce heat distortion temperature ("HDT") and other physical properties including tensile properties.

Common applications for acrylic compositions include production of sheet for eventual thermoforming into a variety of useful products including, for example, sanitary ware. In the formation of, for example, bathtubs and showers from acrylic sheet that has a high enough HDT, the bathtub or shower is backed with catalyzed polyester resin in styrene, i.e. a solvent, thus it is important that the acrylic composition have suitable solvent resistance. Currently, cellcast and continuous cast formed sheet acrylics followed by thermoforming are limited in that they are not extrudable, tend to be higher cost and cannot be used in certain applications. A need exists for an acrylic sheet composition that is extrudable and thermoformable, that has sufficiently high molecular weight, an appropriate HDT, and that has a suitable solvent resistance. The present invention satisfies these needs, while enabling new ways of processing and forming acrylic articles.

SUMMARY OF THE INVENTION

This invention provides for solvent resistant extrudable acrylic compositions and methods of making and using the same. In one embodiment, the compositions can be both extrudable and thermoformable.

In another aspect of the invention, an acrylic composition may have a suitable heat distortion temperature, a suitable ultimate strain, a suitable ultimate stress, a suitable Young's modulus, a suitable polydispersity, and/or no solvent crazing.

In another aspect, the invention provides an acrylic composition having a melt flow index greater than 0.10, and a weight average molecular weight greater than 250,000 daltons.

A further embodiment of the invention is an acrylic composition that includes a multifunctional chain transfer agent and a multifunctional crosslinking agent.

In another embodiment, an extrudable solvent resistant acrylic composition may have a weight average molecular weight of greater than 250,000 daltons, and a number average molecular weight of greater than 80,000 daltons.

DETAILED DESCRIPTION

The term "(meth)acrylate" is understood herein to include an acrylate and/or methacrylate. All weight percents (wt. %) used herein are relative to the total weight of the composition unless otherwise noted.

The acrylic compositions of the present invention may be extrudable, melt callenderable, and/or high molecular weight acrylic compositions exhibiting solvent resistance. In one embodiment such compositions can include compositions that have no solvent crazing in accordance with the solvent craze test method detailed below.

Specifically, the compositions of the present invention may be customized to achieve the individual properties identified below. In one embodiment, the desired physical properties are achieved by including in the composition specific amounts of multifunctional crosslinking agents and multifunctional chain transfer agents to regulate both the degree of crosslinking and the degree of branching in the polymerized article.

Suitable acrylic compositions of the present invention may include greater than 50 wt. % relative to the total weight of the composition of monomer, greater than 6 wt. % relative to the total weight of the composition of comonomer, multifunctional crosslinking agent, multifunctional chain transfer agent, polymerization initiator, and other additives.

Monomer

The acrylic compositions of the present invention may include greater than 50 wt. % relative to the total weight of the composition of methyl (meth)acrylate, such as, for example, 50 wt. %-94 wt. % methyl (meth)acrylate. For example, the composition can include 70 wt. % or greater, or 80 wt. % or greater, and preferably 85, 88, or 90 wt. % or greater methyl (meth)acrylate.

Comonomer

In addition to methyl (meth)acrylate, the acrylic composition of the present invention may include one or more monofunctional monomers, acid-functional monomers, and polymerizable monomers containing a vinyl group or a (meth) acryloyl group. Such monomers may include saturated or unsaturated, substituted or unsubstituted, branched or unbranched, alkyl (meth)acrylates or aryl (meth)acrylates, with or without heteroatom substitutions. Non-limiting examples of comonomers can include: N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, ethyl (meth)acrylate, propyl (meth)acrylate, isopropyl (meth)acrylate, n-butyl (meth)acrylate, amyl (meth)acrylate, isobutyl (meth)acrylate, t-butyl (meth)acrylate, pentyl (meth)acrylate, caprolactone (meth)acrylate, isoamyl (meth)acrylate, hexyl (meth)acrylate, heptyl (meth) acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, butylcarbamylethyl (meth)acrylate, n-isopropyl (meth)acrylamide, halogenated (meth)acrylates, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether. For example, the composition can include ethyl (meth)acrylate, n-butyl (meth)acrylate, or 2-ethyl hexyl (meth)acrylate, and preferably ethyl acrylate or n-butyl acrylate.

The total weight percentage (wt. %) of the comonomer(s), relative to the total weight of the composition, can be greater than 6 wt. %. For example, the composition can include between 6-50 wt. % of a (meth)acrylate monomer, such as 10 wt. % or greater, 12, 14, 16, 20, or 30 wt. % or greater comonomer(s) and preferably 10, 12, or 14 wt. %.

Crosslinking Agent

In addition, the composition of the present invention may include one or more multifunctional crosslinking agents. Such a crosslinking agent can include any multifunctional compounds polymerizable with a (meth)acrylol group. Non-limiting examples of such crosslinking agents include diethylene glycol di(meth)acrylate, 1,4 butanediol di(meth)acrylate, 1,3 butylene glycol di(meth)acrylate, cyclohexane dimethanol di(meth)acrylate, diethylene glycol di(meth)acrylate, dipropylene glycol di(meth)acrylate, ethylene glycol di(meth)acrylate, 1,6 hexanediol di(meth)acrylate, neopentyl glycol di(meth)acrylate, tetraethylene glycol di(meth)acrylate, triethylene glycol di(meth)acrylate, tripropylene glycol di(meth)acrylate, pentaerythritol tri(meth)acrylate, trimethylolpropane tri(meth)acrylate, dipentaerythritol penta (meth)acrylate, di-trimethylolpropane tetra(meth)acrylate, pentaerythritol tetra(meth)acrylate, divinyl esters such as divinyl adipate, and other divinyl compounds such as divinyl sulfide or divinyl sulfone compounds of allyl (meth)acrylate, cyclohexanedimethanol divinyl ether diallylphthalate, diallyl maleate, dienes such as butadiene and isoprene, and mixtures thereof.

The total weight percentage (wt. %) of the crosslinking agent(s), relative to the total weight of the composition, can be between 0.001 wt. % and 2.5 wt. %. For example, the composition can include 0.01 wt. % or greater, 0.05, 0.1, 0.5, 1.0 wt. % or greater crosslinking agent(s), and preferably 0.05, 0.1 or 0.5 wt. % crosslinking agent.

Chain Transfer Agent

The acrylic composition of the present invention may include one or more multifunctional chain transfer agents. Any such chain transfer agent or combination of such agents may be used. Non-limiting examples of multifunctional chain transfer agents include: multifunctional mercaptans, multifunctional aminethiols, multifunctional allyl phenyl ethers, multifunctional allyl benzenes, multifunctional N,N substituted or cyclic dithiocarbamates, multifunctional cyanated dithiocarboxylic acid esters, multifunctional polysulfides, any material that contains at least two mercaptan groups, trimethylolethane tris(3-mercaptopropionate), pentaerythritol tetra(3-mercaptopropionate), dithioterephthalic acid, glycol dimercaptoacetate, glycol dimercaptopropionate, pentaerythritol tetrathioglycolate, trimethylolethane trithioglycolate, trimethylolpropane tris(3-mercaptopropionate) trimethylolpropane trithioglycolate and the like.

The total weight percentage (wt. %) of the chain transfer agent(s), relative to the total weight of the composition, can be between 0.001 wt. % and 5.0 wt. %. For example, the composition can include 0.01 wt. % or greater, 0.1, 0.40, 1.0, 2.0 or 3.0 wt. % or greater chain transfer agent(s), and preferably 0.1, 0.4 or 1.0 wt. % chain transfer agent.

Polymerization Initiators:

The composition of the present invention may also include one or more polymerization initiators. Examples of such initiators include organic peroxides such as diacyls, peroxydicarbonates, monoperoxycarbonates, peroxyketals, peroxyesters, dialky peroxides, diaryl peroxides, and hydroperoxides, for example, lauroyl peroxide. Also useful are azo initiators, examples of which are: azobisisobutyronitrile, azobisisobutyramide, 2,2'-azo-bis(2,4-dimethylvaleronitrile), azo-bis(α-methyl-butyronitrile) and dimethyl-, diethyl- or dibutyl azo-bis(methylvalerate), 4,4 azobis(4-cyanovaleric acid), 2,2 azobis-isobutyric acid dimethyl ester, 1,1 azobis(hexahydrobenzonitrile), 2,2'-azobis(2-methylbutyronitrile), 1,1-azo-bis-(isobutyramidine)dihydrochloride, 1,1-azobis(1-cyanocyclohexane), 2,2'-azobis[2-(5-methyl-2-imidazolin-2-yl)propane]dihydrochloride, 2,2'-azobis[2-(2-imidazolin-2-yl)propane disulfate dihydrate, 2,2'-azobis[N-(2-carboxyethyl)-2-methylpropionamidine]tetrahydrate, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis[2-(2-imidazolin-2-yl)propane]dihydrochloride, 2,2'-azobis(2-methylpropionamide)dihydrochloride, 2,2'-azobis [2-(3,4,5,6-tetrahydropyrimidin-2-yl)propane] dihydrochloride, 2,2'-azobis[2-(2-imidazolin-2-yl)propane], 2,2'-azobis{2-methyl-N-[2-(1-hydroxybuthyl)]propionamide}, 2,2'-azobis(4-methoxy-2,4-dimethyl valeronitrile), dimethyl 2,2'-azobis(2-methylpropionate), 1,1'-azobis(cyclohexane-1-carbonitrile), 1-[(cyano-1-methylethyl)azo]formamide, 2,2'-azobis(N-cyclohexyl-2-methylpropionamide), 2,2'-azobis[N-(2-propenyl)-2-methylpropionamide], and 2,2'-azobis(N-butyl-2-methylpropionamide).

The amount of initiator(s) used can be determined according to the necessary amount to achieve the desired properties as known to those skilled in the art. For example, the amount of initiator may be in the range of from about 0.001 wt. % to about 5.0 wt. % relative to the total weight of the composition, such as from about 0.01 wt. % to about 5 wt. %, or 0.1 wt. % to about 2.5 wt. %. For example, the amount of initiator may be 0.01 wt. % or greater, 0.03 wt. %, 0.1 wt. %, 1.0 wt. %, or even 2.0 wt. % or greater, and preferably 0.01, 0.03 or 0.1 wt. % initiator.

Additives:

In addition to the above components, the present invention can include one or more additional additives used to regulate various chemical and physical properties of the composition and/or polymerized articles made therefrom. Non-limiting examples of such additives include: dyes, organic or inorganic pigments, lubricants, stabilizers, toners, anti-fogging agents, fading inhibitors, thermal stabilizers, metal scavengers, fluorescent whiteners, surfactants, plasticizers, flame retardants, dye precursors, fungicides, antimicrobials, including microban (triclosan), impact modifiers, antistatic agents, magnetic substances, fillers, deglossers, inorganic deglossers, organic deglossers, polymeric deglossers, UV absorbers, and UV stabilizers.

The type and amount of additives used can be determined according to the necessary amount to achieve the desired properties as known to those skilled in the art. For example, the amount of additives can be in the range of from about 0.001 wt % to about 10.0 wt % relative to the total weight of the composition, such as from about 0.01 wt % to about 5 wt %, such as 0.05 or greater, 0.5, 1.0, 2.0 or 2.5 wt. % or greater and preferably 0.05, 0.5, or 1.0 wt % additives.

Residual Monomer

After polymerization, the composition may have a wt. % residual monomer less than 3%, for example less than 1 wt. %, or less than 0.5 wt. %

Physical Properties

Suitable acrylic compositions of the present invention may have one or more of the following suitable physical properties:

(1) a heat distortion temperature greater than 40° C. and less than 120° C., for example, greater than 50, 70, 80, 85, or even greater than 100° C.;

(2) an ultimate strain greater than 0.1 and less than 0.6, for example, greater than 0.3, 0.4, 0.45, or even greater than 0.5;

(3) an ultimate stress greater than 10 psi, and less than 70 psi, for example, greater than 20, 30, 40, 45, or even greater than 50 psi;

(4) a Young's modulus greater than 50 psi and less than 200 psi, for example, greater than 75, 100, 125, 150 or even greater than 175 psi;

(5) a polydispersity greater than 1.2 and less than 6.5, for example, greater than 2.2, 3.0, 4.0, 5.0 or even greater than 5.5;

(6) a melt flow index of greater than 0.1 and less than 4.0 for example, greater than 0.5, 1.0, 1.5, 2.0 or even greater than 2.5;

(7) a weight average molecular weight of greater than 150,000 daltons and less than 700,000 daltons, for example, greater than 250,000, 300,000, 400,000, or even greater than 500,000 daltons;

(8) a degree of crosslinking less than 3%, and greater than 0.1%, for example, less than 2%, 1.5%, 1.0%, 0.5%, or even less than 0.25%;

(9) passes the solvent resistance and/or solvent craze tests.

Uses:

The compositions of the present invention after polymerization may be used to form various articles, coatings, films, layers, capping layers and the like that have the delineated properties. These compositions may be used wherever acrylic compositions having the delineated physical properties are needed as understood by those of skill in the art. The polymerized compositions may be thermoformed, extruded, co-extruded with other materials, injection molded or calendared or any other method of processing polymeric materials to form articles or impart desired characteristics to other materials. Specific non-limiting examples of uses of the compositions of the present invention after polymerization are:

as articles, extruded articles, thermoformed articles, cast articles, polymeric sheets, sanitary ware, bathtubs, sinks, water holding vessels, shower surrounds, spas, showers, containers, coatings, layers, outer layers, shells, finishes, veneers, shields, barriers, crusts, armors, skins, husks, wrappers, casings, jackets, sheaths, sheathing, insulation, surfaces, covers, facings, capping layers, parts, construction materials, films and the like;

to serve as capping layers for parts, pultruded or co-extruded parts, window lineals, siding, vinyl parts, and vinyl siding;

to impart a characteristic to an article, including durability, weatherability, UV resistance, solvent resistance, solvent craze resistance, protection against damage, impact resistance, chemical resistance, stress resistance, color, texture, structural stability, tone, anti-fogging, fading inhibition, thermal stability, flame resistance, bacterial resistance, viral resistance, antimicrobial resistance, static resistance, and magnetic properties by coating, coextruding, laminating, covering, protecting, forming a film on, or a layer on, an article with a composition of the present invention.

In addition, the composition may be used (when it does not include a UV absorber) as a UV transparent sheet for use in any of the previous mentioned uses where an acrylic composition without a UV absorber is needed. Additional such uses include medical and scientific applications where penetration of UV light is desired, an example of which would be in UV sterilizers or sanitizers either as a container or as coating or protective layer or barrier, for example, to separate a UV generator from physical contact. In addition, other uses include use in tanning beds and other tanning facilities. Other uses of a UV transparent sheet of the current composition can include virtually any use requiring UV transparency and any of the other identified properties of the present invention. Such uses are within the knowledge of those of skill in the art.

EXAMPLES

The following examples are given as particular embodiments of the invention and to demonstrate the practice and advantages thereof. It is to be understood that the examples are given by way of illustration and are not intended to limit the specification or the claims that follow in any manner.

The following glossary provides component names and definitions as used in the Examples and are understood to refer to the compounds or compositions noted:

| Glossary | |
|---|---|
| DTBSP— | dithio-bis(stearyl propionate)—commercially available from Dow Chemical Company, Midland, MI. |
| EA — | ethyl acrylate—commercially available from Alfa Aesar, Karlsruhe, Germany. |
| LAUROX— | lauroyl peroxide—commercially available from Fisher Scientific, Fairlawn, New Jersey. |

-continued

| Glossary | |
|---|---|
| LOWILITE 29— | 2-(2-hydroxy-5-tert-octylpenyl)-2H-benzo-triazole—commercially available from Chemtura, formerly Great Lakes Chemical Co., West Lafayette, Indiana. |
| MMA— | methyl methacrylate—commercially available from Lucite ® International, |
| nBA— | n-butyl acrylate—commercially available from Spectrum Chemical and Laboratory Products, New Brunswick, NJ. |
| Oxalic acid— | commercially available from Spectrum Chemical and Laboratory Products, New Brunswick, NJ. |
| PETMP— | pentaerythritol tetra-(3-mercaptopropionate)—commercially available from Dow Chemical Company, Midland, MI. |
| Stearic acid— | commercially available from Spectrum Chemical and Laboratory Products, New Brunswick, NJ. |
| TMTP— | trimethyolpropane trimethacrylate—commercially available from Sartomer Company, Exton, PA |
| TRIGANOX F-C50— | tert-butyl peroxyacetate—commercially available from Akzo Nobel, Arnhem, The Netherlands. |

TABLE 1

Composition for Examples 1A and 1B

| Function | Component | Amount |
|---|---|---|
| Monomer | MMA | 8711.0 lbs |
| Thermal stabilizer | DTBSP | 10.0 lbs |
| Lubricant | Stearic acid | 10 lbs |
| Initiator | Dilauroyl peroxide | 4.67 lbs |
| UV absorber | LOWLITE 29 | 2.0 lbs |
| Crosslinking agent | TMTP | 10 lbs |
| Comonomer | EA | 1200 lbs |
| Chain transfer agent | PETMP | 50 lbs |
| Metal scavenger | Oxalic acid | 0.11 lbs |
| Initiator | TRIGONOX F-50C | 1.14 lbs |
| Water | Water | 1.10 lbs |

Example 1A

Mixing and Preparation

The ingredients as listed in Table 1 were added to a 1200 gallon stainless steel stirred tank. The pressure in the tank was reduced to less than 4 psi and held at that pressure for 20 minutes with constant stirring to degas the solution. At the end of the degassing process the pressure in the tank was raised to ambient with nitrogen. The stirring was stopped, and the solution was transferred through a 10 micron filter into nylon bags.

Polymerization

The bags lay horizontally on trays which were stacked one above the other with about 3 inches of clearance between the bottom of a tray and the top of the bag below. A total of 25 trays fit into a rack. The bags were each filled with 100 pounds of solution. The filled bags measured about 1" in vertical solution thickness. The racks were put into a circulating air oven, which was at room temperature. Two racks per oven. The solution was converted to polymer cakes by cycling the oven temperature. The solution was heated from room temperature to 60° C. in 1 hour, held at 60° C. for 17.8 hrs, raised from 60° C. to 63° C. in <5 minutes and held at 63° C. for 8.5 hours. Next, the solution was heated from 63° C. to 70° C. in 15 minutes, held at 70° C. for 3 hours, heated from 70° C. to 95° C. in 30 minutes and held at 95° C. for 2.4 hours. Finally, the solution was heated from 95° C. to 130° C. in 1 hour, held at 130° C. for 2.2 hours and then allowed to cool to room temperature over 8 hours. After polymerization the cakes were unloaded, and the nylon removed. The polymer was crushed to particles approximately 0.5 inches in maximum diameter.

Pelletizing

The crushed polymer was extruded through a vented NRM Pacemaker WC PM III Extruder with a 6 inch water cooled screw (L/D=40/1). The extruder temperatures were controlled with nine heating zones along the barrel followed by heated zones around a static mixer, screen changer, and a 48 strand die with three heated zones. The temperature profile for each of these zones was as follows: 280° F. at the entrance, barrel zone #1 at 290° F., barrel zone #2 at 370° F., barrel zone #3 at 500° F., barrel zone #4 at 505° F., barrel zone #5 at 505° F., barrel zone #6 at 515° F., barrel zone #7 at 515° F., barrel zone #8 at 515° F., barrel zone #9 at 515° F., static mixer zone at 505° F., screen changer zone at 470° F., 48 strand die zones 1, 2, and 3 each at 470° F., and the exit at 470° F. The screw was starve fed and residual volatiles were vented off using a vacuum pump. The molten polymer strands exiting the extruder were routed through a water cooling bath, air dried, cut into pellets approximately 0.125 inches in diameter× 0.125 inches long, sieved, the molecular weight, and melt flow index were measured, and the pellets were conveyed to packaging.

Sheeting

The pellets were then further extruded into sheet form of varying thicknesses as desired. The ultimate strain, ultimate stress, Young's modulus, heat distortion temperature, solvent resistance and solvent crazing of a nominal ⅛" thick sheet were measured. These properties are reported in Table 3.

Example 1B

A second campaign of the material described in Example 1A was executed. The various properties were measured and are also reported in Table 3.

TABLE 2

Composition for Example 2

| Function | Component | Amount |
|---|---|---|
| Monomer | MMA | 8718.0 lbs |
| Thermal stabilizer | DTBSP | 10.0 lbs |
| Lubricant | Stearic acid | 10 lbs |
| Initiator | Dilauroyl peroxide | 4.00 lbs |
| UV absorber | LOWLITE 29 | 2.0 lbs |
| Crosslinking agent | TMTP | 10 lbs |
| Comonomer | EA | 1200 lbs |
| Chain transfer agent | PETMP | 45 lbs |
| Metal scavenger | Oxalic acid | 0.11 lbs |
| Initiator | TRIGONOX F-50C | 1.14 lbs |
| Water | Water | 1.10 lbs |

Example 2

Crushed particles were formed using the composition of Table 2 according to the procedure in Example 1A and were then extruded into pellets with 1.2% by weight titanium dioxide pigment, and the molecular weight and melt flow index were measured. The pellets were subsequently extruded into sheet form and the ultimate strain, ultimate stress, Young's modulus, heat distortion temperature, solvent resistance and solvent crazing of the resulting sheet were measured. These properties are reported in Table 3.

TABLE 3

Examples 1-2 and Comparative Examples A-D

| Property | Ex. 1A | Ex. 1B | Ex. 2 | Comp. Ex. A | Comp. Ex. B | Comp. Ex. C | Comp. Ex. D |
|---|---|---|---|---|---|---|---|
| Heat Distortion Temperature (° C.) | 86 | 83 | 85 | 100 | 101 | 104 | 105 |
| wt. % Comonomer | 12 | 12 | 12 | 4 | 6 | 4 | 5 |
| Melt Flow Index | 3.2 | 1.6 | 1.3 | 2.1 | 1.4 | 0 | DNF |
| Molecular Weight (thousands of daltons) | 395 | 561 | 536 | 166 | 154 | 1,146 | ∞ |
| Ultimate Strain* | 0.53 | 0.55 | 0.53 | 0.49 | 0.47 | 0.52 | 1.069 |
| Ultimate Stress* (psi) | 40 | 49 | 46 | 49 | 51 | 82 | 88 |
| Young's Modulus* (psi) | 121 | 144 | 133 | 177 | 187 | 277 | 238 |
| Polydispersity | 4.71 | 4.71 | 4.78 | 2.08 | ND | 7.51 | ND |
| Solvent Crazing | None | None | None | Light Failed | Light Failed | None Failed | None Failed |
| Solvent Resistance at 1750 psi stress | Pass | Pass | Pass | Failed | Failed | Failed | Failed |

Table Notes:
*These properties were measured at 165° C.
Comp. A: This comparative example is an extrudable acrylic composition commercially available from Lucite International as PERSPEX ® MS 983.
Comp. B: This comparative example is an extrudable acrylic composition known as MS 505 commercially available from Lucite International.
Comp. C: This comparative example is a high molecular weight, continuous-cast, acrylic composition commercially available from Lucite International as Lucite ® L.
Comp. D: This comparative example is a high molecular weight, continuous-cast, crosslinked acrylic composition formulated for deep draw thermoforming over a wide temperature range that is commercially available from Lucite International as Lucite ® XL.
DNF = Did not flow
ND = Not determined.

TABLE 4

Composition for Example 3

| Function | Component | Amount |
|---|---|---|
| Monomer | MMA | 8718.0 lbs |
| Thermal stabilizer | DTBSP | 10.0 lbs |
| Lubricant | Stearic acid | 10 lbs |
| Initiator | Dilauroyl peroxide | 3.00 lbs |
| UV absorber | LOWLITE 29 | 2.0 lbs |
| Crosslinking agent | TMTP | 10 lbs |
| Comonomer | EA | 1200 lbs |
| Chain transfer agent | PETMP | 45 lbs |
| Metal scavenger | Oxalic acid | 0.11 lbs |
| Initiator | TRIGONOX F-50C | 1.14 lbs |
| Water | Water | 1.10 lbs |

Example 3

A sample using the composition in Table 4 was prepared as in Example 1 and was compared against existing commercial acrylic sheet products. The results are presented in Table 5.

TABLE 5

Example 3 and Comparative Examples C-G

| Acrylic Product | Solvent Resistance at 1312 psi stress | Solvent Resistance at 1750 psi stress | Young's Modulus* (psia) | Ultimate Strain* (psia) | Ultimate Stress* (psia) |
|---|---|---|---|---|---|
| Example 3 | Pass | Pass | 100.2 | 0.512 | 34.3 |
| Comp. Example C | Pass | Fail | 196 | 1.148 | 79.8 |
| Comp. Example D | Pass | Fail | 240.5 | 0.519 | 66.8 |
| Comp. Example E | Pass | Fail | 67.2 | 0.444 | 18.5 |
| Comp. Example F | Pass | Fail | 105.5 | 0.456 | 30.4 |
| Comp. Example G | Fail | Fail | 107.6 | 0.452 | 28.9 |

Table Notes:
*These properties were measured at 185° C.
Comp. C: This comparative example is a high molecular weight, continuous-cast, acrylic composition commercially available from Lucite International as Lucite ® L and has a moleclular weight of 1,146,000 and a polydispersity of approximately 7.5.
Comp. D: This comparative example is a high molecular weight, continuous-cast, crosslinked acrylic composition formulated for deep draw thermoforming over a wide temperature range that is commercially available from Lucite International as Lucite ® XL, the molecular weight is ∞.
Comp. E: This comparative example is a melt calendared acrylic sheet composition commercially available from Lucite International as Lucite ® CP having a molecular weight of 150,000 and a polydispersity of 1.82.
Comp. F: This comparative example is an extruded commercial acrylic sheet available from Plaskolite, Inc., known as Plaskolite Optix ® having a molecular weight of 147,000 and a polydispersity of 1.87.
Comp. G: This comparative example is an extruded commercial acrylic sheet available from Cyro Industries, known as Cyro Acrylite ® FF, having a molecular weight of 128,000 and a polydispersity of 1.95.

Examples 4-16

Acrylic pellets and sheet were formed from the various compositions of Examples 4-16 as indicated in the following tables. The polymerization was carried out as follows. The ingredients required for the desired polymer formulations were added to a five liter vacuum filter flask containing a magnetic stirring bar. The flask mouth was sealed with a rubber stopper, and the flask was placed on a magnetic stirrer. The solution was then stirred for thirty minutes. At the end of the stirring, the flask was connected to a vacuum pump and evacuated to approximately 40 mm Hg pressure for fifteen minutes to degas the solution. The degassed solution was transferred to a nylon bag measuring 15"×18", with a liquid level measuring approximately 1" on a flat level surface. The filled bags were placed in an oven at room temperature (RT). The bag contents were polymerized by cycling the bags through the following temperatures: heated from room temperature to 60° C. in less than 1 hour, held at 60° C. for 15 hours, heated from 60° C. to 63° C. in less than 5 minutes, held at 63° C. for 3 hours, heated from 63° C. to 70° C. in less than 15 minutes, held at 70° C. for 5 hours, heated from 70° C. to 95° C. in less than 30 minutes, held at 95° C. for 2 hours, heated from 95° C. to 130° C. in less than 1 hour, held at 130° C. for 2 hours, cooled from 130° C. to room temperature in 8 hours.

At the end of the thermal cycle the nylon was stripped from the hardened polymer cakes. The cake material was crushed to approximately 0.125" sized pieces then analyzed. Chemical and physical properties were evaluated according to the test procedures detailed below with the results as indicated in tables 6 and 7.

TABLE 6

Examples 4-9

| Example | 4 | 5 | 6 | 7 | 8 | 9 |
|---|---|---|---|---|---|---|
| Monomer - MMA | 2552.8 | 2558.8 | 2552.8 | 2558.8 | 2558.8 | 2558.8 |
| Comonomer - nBA | 420 | 420 | 420 | 420 | 420 | 420 |
| Chain Transfer Agent - PETMP | 15 | 15 | 15 | 15 | 15 | 15 |
| Crosslinking Agent - TMTP | 3.0 | 3.0 | 3.0 | 3.0 | 3.0 | 3.0 |
| Initiator - LAUROX | 1.4 | 1.4 | 1.6 | 1.6 | 1.8 | 1.8 |
| Thermal Stabilizer - DTBSP | 3.0 | 3.0 | 3.0 | 3.0 | 3.0 | 3.0 |
| Additive Solution | 4 | 5 | 4 | 5 | 4 | 5 |
| Total | 2999.2 | 3006.2 | 2999.4 | 3006.4 | 3005.6 | 3006.6 |
| Melt Flow Index | 4.1 | 3.9 | 4.8 | 5.0 | 5.7 | 5.4 |
| Molecular Weight (thousands of daltons) | 505 | 436 | 521 | 523 | 493 | 496 |
| Polydispersity | 3.98 | 4.01 | 3.90 | 4.31 | 4.26 | 3.90 |

Table Notes:
The Additive Solution is a combination of methyl methacrylate, Trigonox F-50C, and oxalic acid in the following ratio: 41.34 g MMA:4.257 ml Trigonox F-50C:4.4 ml 1.0M oxalic acid.
ND = Not determined

TABLE 7

Examples 10-16

| Example | 10 | 11 | 12 | 13 | 14 | 15 | 16 |
|---|---|---|---|---|---|---|---|
| Monomer - MMA | 2673.8 | 2673.8 | 2615.3 | 2613.8 | 2613.8 | 2615.3 | 2615.3 |
| Comonomer - nBA | 300 | 0.0 | 0.0 | 0.0 | 0.0 | 0.0 | 0.0 |
| Comonomer - EA | 0.0 | 300 | 360 | 360 | 360 | 360 | 360 |
| Chain Transfer Agent - PETMP | 15 | 15 | 13.5 | 15 | 15 | 13.5 | 13.5 |
| Crosslinking Agent - TMTP | 3.0 | 3.0 | 3.0 | 3.0 | 3.0 | 3.0 | 3.0 |
| Initiator - LAUROX | 1.2 | 1.2 | 1.4 | 1.2 | 1.4 | 1.2 | 1.4 |
| Thermal Stabilizer - DTBSP | 3.0 | 3.0 | 3.0 | 3.0 | 3.0 | 3.0 | 3.0 |
| Additive Solution | 4 | 4 | 4 | 4 | 4 | 4 | 4 |
| Total | 3000 | 3000 | 3000.2 | 3000 | 300.2 | 3000 | 3000.2 |
| Melt Index | 1.54 | 1.10 | 0.60 | 1.48 | 1.47 | 0.59 | 0.57 |
| Ultimate Strain* | 0.40 | 0.46 | 0.44 | 0.42 | 0.39 | 0.44 | 0.41 |
| Ultimate Stress* (psi) | 15.7 | 20 | 23.5 | 19 | 22 | 23.4 | 24 |
| Young's Modulus* (psi) | 62 | 75 | 78 | 60 | ND | 63 | 76 |

Table Notes:

*These properties were measured at 165° C. and the sheets each had a nominal ⅛" thickness with the exceptions of Examples 11 and 14 which had a thickness of 0.12".

The Additive Solution is a combination of methyl methacrylate, Trigonox F-50C, and oxalic acid in the following ratio: 41.34 g MMA:4.257 ml Trigonox F-50C:4.4 ml 1.0M oxalic acid.

ND = Not determined.

Test Procedures

In the description, the claims and the examples, the following test methods were employed to determine various reported characteristics and properties.

Melt Flow Index

The melt flow index was measured by ASTM Method D1238 at 230° C. using a 3.8 kg mass.

Heat Distortion Temperature (HDT)

The HDTs were measured using modulated temperature differential scanning calorimetry (MDSC) on a TA Instruments 2920 MDSC. The reported values were taken from the extrapolated onset of Tg. This test method is based on ASTM E 1356-03 Standard Test Method for Assignment of the Glass Transition Temperatures by Differential Scanning Calorimetry (DSC) with modifications made to accommodate the requirements of MDSC. These modifications to the ASTM E 1356-03 test included:

(1) Linear heating rates were programmed between 3° C. per minute. Temperature modulation periods were set at ±1° C. to allow oscillation cycles of from 30-80 seconds. Temperature modulation amplitudes control the instantaneous heating rate, and were set to approximately +/−1° C. The period was 60 seconds.

(2) Cooling rates were approximately 5-10° C./min, the maximum possible with the liquid nitrogen cooling accessory (LNCA)

(3) First heating ramps were used, second heating ramps were not used.

(4) A graph of the heat capacity versus temperature signal was used to determine the following temperatures: Extrapolated Onset of Tg, the Inflection point, and the Extrapolated Endpoint. The Extrapolated onset of Tg is reported as the HDT.

Molecular Weight and polydispersity

Molecular weight distribution was measured by conventional gel permeation chromatographic (GPC) methods (also known as size exclusion chromatography or SEC) using an Agilent 1100 series GPC which was equipped with an isocratic pump and a refractive index detector. The columns were calibrated with narrow band poly(methyl methacrylate) standards. Polydispersity was calculated from the molecular weight distribution and equals the ratio of the weight average molecular weight to the number average molecular weight.

Biaxial Tensile Properties

Biaxial tensile properties of sheet samples were measured on a Costech 2000 Process Simulator, commercially available from Costech Associates, Inc. Newark, Del. using the following method:

(1) Samples of each acrylic sheet were cut into 2⅞" diameter blemish free discs and conditioned in a vacuum oven at 75° C. for approximately 4 hours to minimize moisture content that may have been absorbed during storage.

(2) Each disc was clamped into the instrument and heated to the temperature indicated in the Tables. The inside diameter of the clamped section was 2". The sample disc was heated on both the top and bottom, with the top surface temperature of the sheet being monitored with a contact thermocouple.

(3) When the top surface temperature of the sample reached the desired temperature, a fixed volume of Argon was injected into the chamber below the sample. The rate of injection of the Argon was controlled with an in-line control valve. Under the Argon pressure, the sample forms a bubble. The initial pressure and rate of injection are used for controlling the strain rate of the sample. The rate of injection was controlled to allow for full formation and bursting of the bubble in between 5 to 15 seconds, while the gas supply was maintained at 25 psig.

(4) Based on the volume and pressure of the Argon transferred into the bubble and the rate of transfer, the Young's modulus, ultimate strain, and ultimate stress were calculated.

(5) The ultimate stress and strain were determined at the rupture point of the bubble.

Solvent Craze Test

Thermoformed parts using acrylic sheets formed from the compositions of the invention were made on a Brown Thermoformer (Brown Machine LLC, Beaverton, Mich.). The sheet surface temperature was determined with temperature indicating tape to +/−10° F. The acrylic sheets were all 0.125×10×10 inches in size. The sheet was heated on both sides simultaneously with radiant heat to 300° F. The hot sheet was removed from the oven and immediately formed mechanically in three dimensions over a male mold. The formed parts were shaped like truncated pyramids 7.5 inches square at the base and 4.5 inches square at the top. The depth of draw was 3 inches. The part stayed in contact with the forming surface until the sheet was cooled to about 125° F. The parts were cooled to room temperature.

Craze testing of the formed parts was performed using a general purpose acrylic bonding orthophthalic polyester AOC's Resin Solution Code number H520-C, Styrene Content: 41.7%). The inside of each room temperature, formed part was completely coated with an initiated styrene/resin solution (1.75% Methyl Ethyl Ketone Peroxide mixed with 98.25% of Resin Solution). The solution was allowed to polymerize in a vented hood on the inside of the part for 24 hours, and then, the part was examined from looking from the outside of the part in towards the inside of the part (i.e. by looking through the uncoated outside surface in towards the coated inner surface) in direct low angled lighting for stress craze lines. The presence of any craze lines visible to the naked eye indicated a failure of the test.

Solvent Resistance Test

Solvent stress resistance was measured by the procedure described in ASTM Method F 791-96 procedure A. The individual sheet thicknesses were measured and the stresses were kept constant for each sheet by correcting for actual thickness of the sheet. The solvent stress resistance was measured at 1312 psi and 1750 psi with 100% reagent grade styrene as the solvent. All sheet samples were preconditioned as follows: the specimens were dried in an oven at 90° C. for 16 hours, cooled to room temperature, placed in a desiccator at room temperature for 2.5 hours, and tested immediately after removal from the desiccator. The sheets used were all nominal ⅛" thick sheets. The sheets were 1" wide by 4" long. The sheets were considered to pass the test at each stress if there was no crazing or cracking visible to the naked eye after 5 minutes of exposure to the solvent.

What is claimed is:

1. An acrylic composition, comprising:
   i) 50-94 wt. % of a methyl (meth)acrylate monomer, relative to the total weight of the composition;
   ii) 6-50 wt. % of a comonomer, relative to the total weight of the composition;
   iii) a weight average molecular weight of greater than 250,000 Daltons; and
   iv) a solvent resistance of at least 1750 psi.

2. The composition of claim 1, wherein the composition is an extrudable acrylic composition.

3. The composition of claim 1, wherein the composition has no solvent crazing.

4. The composition of claim 1, further comprising a melt flow index greater than 0.50.

5. The composition of claim 1, further comprising a number average molecular weight of greater than 80,000 Daltons.

6. The composition of claim 1, further comprising a suitable heat distortion temperature.

7. The composition of claim 1, further comprising a polydispersity of greater than 2.5.

8. The composition of claim 1, wherein the comonomer comprises ethyl (meth)acrylate.

9. The composition of claim 1, wherein the composition further comprises a multifunctional crosslinking agent, a multifunctional chain transfer agent, or a multifunctional chain transfer agent and a multifunctional crosslinking agent.

10. The composition of claim 9, wherein the multifunctional chain transfer agent comprises pentaerythritol tetra(3-mercaptoproprionate).

11. The composition of claim 9, wherein the multifunctional crosslinking agent comprises trimethylolpropane trimethacrylate.

12. An acrylic composition, comprising:
  i) 50-94 wt. % of a methyl (meth)acrylate monomer, relative to the total weight of the composition;
  ii) 6-50 wt. % of a comonomer, relative to the total weight of the composition;
  iii) a multifunctional crosslinking agent, a multifunctional chain transfer agent, or a multifunctional crosslinking agent and a multifunctional chain transfer agent; and
  iv) a solvent resistance of at least 1750 psi.

13. An extrudable acrylic composition, comprising:
  i) 50-94 wt. % of a methyl (meth)acrylate monomer, relative to the total weight of the composition;
  ii) 6-50 wt. % of a comonomer, relative to the total weight of the composition;
  iii) a polydispersity of greater than 2.5; and
  iv) a solvent resistance of at least 1750 psi.

14. An article formed from the composition of claim 1.

15. A polymeric sheet formed form the composition of claim 1.

16. A construction material formed from the composition of claim 1.

17. The acrylic composition of claim 13, wherein the composition has a melt flow index greater than 0.50.

18. The acrylic composition of claim 12, wherein the composition has a melt flow index greater than 0.50.

19. The acrylic composition of claim 12, further comprising a number average molecular weight of greater than 80,000 Daltons.

20. The acrylic composition of claim 12, wherein the composition is an extrudable acrylic composition.

* * * * *